United States Patent
Kang et al.

(10) Patent No.: US 9,800,386 B2
(45) Date of Patent: *Oct. 24, 2017

(54) METHOD AND APPARATUS FOR TRANSMITTING CHANNEL STATE INFORMATION IN MULTI-NODE SYSTEM

(71) Applicant: LG ELECTRONICS INC., Seoul (KR)

(72) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,885

(22) Filed: Sep. 19, 2016

(65) Prior Publication Data

US 2017/0005767 A1    Jan. 5, 2017

Related U.S. Application Data

(63) Continuation of application No. 14/115,070, filed as application No. PCT/KR2012/004181 on May 25, 2012, now Pat. No. 9,490,957.

(Continued)

(51) Int. Cl.
*H04L 5/00* (2006.01)
*H04B 7/06* (2006.01)

(52) U.S. Cl.
CPC ......... *H04L 5/0053* (2013.01); *H04B 7/0626* (2013.01); *H04B 7/0636* (2013.01);
(Continued)

(58) Field of Classification Search
None
See application file for complete search history.

(56) References Cited

U.S. PATENT DOCUMENTS

2009/0190528 A1   7/2009   Chung et al.
2009/0245169 A1   10/2009  Zhang et al.
(Continued)

FOREIGN PATENT DOCUMENTS

CN   101764681 A   6/2010
CN   101981869 A   2/2011
(Continued)

OTHER PUBLICATIONS

3GPP TS 36.213 version 10.1.0 Release 10, Physical Layer Procedures, Apr. 2011.*

(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

A method and a base station (BS) for receiving channel state information are discussed. The method according to an embodiment includes transmitting a radio resource control (RRC) signal to a user equipment (UE), the RRC signal including a plurality of configurations for periodic channel state information (CSI) reports; transmitting, to the UE, a plurality of CSI reference signals (CSI-RSs); and receiving, from the UE, generated CSI for the plurality of CSI-RSs based on the RRC signal. Each of the plurality of configurations for the periodic CSI reports includes an indicator indicating an uplink subframe to be used, by the UE, for transmitting CSI corresponding to a specific one of the periodic CSI reports.

4 Claims, 16 Drawing Sheets

Related U.S. Application Data

(60) Provisional application No. 61/490,602, filed on May 27, 2011.

(52) U.S. Cl.
CPC .......... *H04L 5/0048* (2013.01); *H04L 5/0057* (2013.01); *H04L 5/0023* (2013.01)

(56) References Cited

U.S. PATENT DOCUMENTS

| | | |
|---|---|---|
| 2010/0296472 A1 | 11/2010 | Lee et al. |
| 2010/0323720 A1 | 12/2010 | Jen |
| 2011/0170435 A1 | 7/2011 | Kim et al. |
| 2011/0269490 A1 | 11/2011 | Earnshaw et al. |
| 2011/0274099 A1 | 11/2011 | Kwon et al. |
| 2012/0082042 A1* | 4/2012 | Lunttila ............... H04B 7/0626 370/252 |
| 2012/0106374 A1 | 5/2012 | Gaal et al. |
| 2012/0201154 A1* | 8/2012 | Chandrasekhar ..... H04W 24/10 370/252 |
| 2012/0213261 A1 | 8/2012 | Sayana et al. |
| 2012/0275398 A1* | 11/2012 | Chen ..................... H04W 24/10 370/329 |
| 2012/0281563 A1* | 11/2012 | Comsa .................. H04W 24/10 370/252 |

FOREIGN PATENT DOCUMENTS

| | | |
|---|---|---|
| JP | 2011-78019 A | 4/2011 |
| KR | 10-2009-0076784 A | 7/2009 |
| KR | 10-2009-0082851 A | 7/2009 |
| KR | 10-2010-0058399 A | 6/2010 |
| WO | 2011/050856 A1 | 5/2011 |

OTHER PUBLICATIONS

3GPP TS 36.211 version 10.0.0 Release 10, Physical Channels and Modulation, Jan. 2011.*

R1-110001, Final Report of 3GPP TSG TAN WG1 #63 v1.0.0, Jan. 2011.*

3GPP, 3rd Generation Partnership Project; Technical Specification Group Radio Access Network; Evolved Universal Terrestrial Radio Access (E-UTRA); Physical layer procedures (Release 10), 3GPP TS 36.213, V10.1.0, Mar. 2011, pp. 1-115.

3GPP, "3rd Generation Partnership Project; Technical Specification Group Radio Access Network; Physical layer procedures (Release 8)", 3GPP TS 36.213, V0.1.0, Oct. 2006, pp. 1-11.

Alcatel-Lucent et al., "Remaining details of CSI reporting modes on PUCCH", 3GPP TSG RAN WG1 Meeting #63, Agenda 6.3.2.1, Jacksonville, USA, Nov. 15-19, 2010, 17 pages, Tdoc R1-105989.

Huawei et al., "Periodic CQI/PMI/RI reporting for CA", 3GPP TSG WG1 Meeting #63, Agenda 6.2.1.2, Jacksonville, Florida, Nov. 15-19, 2010, 5 pages, R1-105833.

LG Electronics, "Discussions on CSI feedback enhancement", 3GPP TSG RAN WG1 Meeting #65, Agenda Item: 6.3.2.2, Barcelona, Spain, May 9-13, 2011, 5 pages, R1-111788.

LG Electronics, "High-level View of DL CoMP Schemes," 3GPP TSG RAN WG1 Meeting #63bis, R1-110384, Dublin, Ireland, Jan. 17-21, 2011, pp. 1-3.

Nokia Siemens Networks et al., "CSI reporting for Carrier Aggregation", 3GPP TSG RAN WG1 Meeting #61bis, Agenda 6.2.8, Dresden, Germany, Jun. 28, 2010-Jul. 2, 2010, 2 pages, R1-103797.

Research in Motion et al., "Downlink CSI Feedback for Low-Power Nodes", 3GPP TSG RAN WG1 Meeting #65, Agenda Item: 6.3.2.2, Barcelona, Spain, May 9-13, 2011, 6 pages, R1-111662.

Texas Instruments, "CSI reporting based on restricted measurements in Rel-10", 3GPP TSG RAN WG1 #63bis, Agenda Item: 6.2.6, Dublin, Ireland, Jan. 17-21, 2011, 7 pages, R1-110263.

* cited by examiner

FIG. 7

| Resource Index | Multiplexed CS Index | PUCCH format index type | Physical RB index |
|---|---|---|---|
| 0 | 0 | $n^{(2)}_{PUCCH}$ | m=0 |
| 1 | 1 | | |
| ... | ... | | |
| 11 | 11 | | |
| 13 | 0 | $n^{(1)}_{PUCCH}$ | m=1 |
| 14 | 1 | | |
| ... | ... | | |
| 23 | 11 | | |
| 24,25,26 | 0 | $n^{(2)}_{PUCCH}$ | m=2 |
| 27,28,29 | 1 | | |
| ... | ... | | |
| 45,46,47 | 7 | | |
| 48 | 8 | Guard Cyclic Shift(not used) | |
| 49 | 9 | | |
| 50 | 10 | $n^{(2)}_{PUCCH}$ | m=2 |
| 51 | 11 | Guard Cyclic Shift(not used) | |
| 52,53,54 | 0 | $n^{(1)}_{PUCCH}$ | m=3 |
| 55,56,57 | 1 | | |
| ... | ... | | |
| 85,86,87 | 11 | | |
| 88,89,90 | 0 | $n^{(1)}_{PUCCH}$ | m=4 |
| 91,92,93 | 1 | | |
| ... | ... | | |
| 121,122,123 | 11 | | |

| 2/2a/2b #1 (m=1) | 2/2a/2b #0 (m=0) |
| 1/1a/1b (m=3) | 1/1a/b+2/2a/2b (m=2) |
| 1/1a/1b (m=5) | 1/1a/1b (m=4) |
| | |
| 1/1a/1b (m=4) | 1/1a/1b (m=5) |
| 1/1a/b+2/2a/2b (m=2) | 1/1a/1b (m=3) |
| 2/2a/2b #0 (m=0) | 2/2a/2b #1 (m=1) |

One subframe

METHOD AND APPARATUS FOR TRANSMITTING CHANNEL STATE INFORMATION IN MULTI-NODE SYSTEM

CROSS-REFERENCE TO RELATED APPLICATIONS

This Application is a Continuation of co-pending U.S. patent application Ser. No. 14/115,070 filed on Oct. 31, 2013, which is filed as the National Phase of PCT/KR2012/004181 filed on May 25, 2012, which claims the benefit under 35 U.S.C. §119(e) to U.S. Provisional Application No. 61/490,602 filed on May 27, 2011, all of which are hereby expressly incorporated by reference into the present application.

BACKGROUND OF THE INVENTION

Field of the Invention

The present invention relates to wireless communication and, more particularly, to a method and apparatus in which user equipment transmits channel state information in a multi-node system.

Discussion of the Related Art

The data transfer rate over a wireless communication network is recently rapidly increasing. This is because a variety of devices, such as smart phones and tablet PCs which require Machine-to-Machine (M2M) communication and a high data transfer rate, are appearing and spread. In order to meet a higher data transfer rate, carrier aggregation technology and cognitive radio technology for efficiently using more frequency bands and multiple antenna technology and multiple base station cooperation technology for increasing the data capacity within a limited frequency are recently are highlighted.

Furthermore, a wireless communication network is evolving toward a tendency that the density of accessible nodes around a user is increasing. Here, the term 'node' may mean antennas or a group of antennas which are spaced apart from one another in a Distributed Antenna System (DAS). However, the node is not limited to the meaning, but may be used as a broader meaning. That is, the node may become a pico eNB (PeNB), a home eNB (HeNB), a Remote Radio Head (RRH), a Remote Radio Unit (RRU), or a relay. A wireless communication system including nodes having a high density may have higher system performance through cooperation between nodes. That is, if the transmission and reception of each node are managed by one control station so that the nodes are operated as antennas or a group of antennas for one cell, the node may have much more excellent system performance as compared with when the nodes do not cooperate with each other and thus each node operated as an independent Base Station (BS) (or an Advanced BS (ABS), a Node-B (NB), an eNode-B (eNB), or an Access Point (AP)). A wireless communication system including a plurality of nodes is hereinafter referred to as a multi-node system.

In a multi-node system, a node which transmits a signal to UE may be different for each UE and a plurality of nodes may be set. Here, each node may send a different reference signal. In this case, UE may measure a channel state between the UE and each node using a plurality of reference signals and periodically feed back the channel state information. In this case, to allocate radio resources through which channel state information will be fed back to UE using what method is problematic.

SUMMARY OF THE INVENTION

The present invention provides a method and apparatus for transmitting channel state information in a multi-node system.

In an aspect, a method of user equipment transmitting channel state information is provided. The method comprising: reserving a plurality of configured Physical Uplink Control Channel (PUCCH) resources through which channel state information can be transmitted; receiving a plurality of reference signals; generating channel state information by measuring each of the plurality of reference signals; and transmitting the channel state information about each of the plurality of reference signals through the plurality of PUCCH resources.

Each of the plurality of reference signals may be received from different nodes, and the different nodes are nodes controlled by one base station.

The plurality of PUCCH resources may be configured through a plurality of pieces of PUCCH configuration information received through a higher layer signal.

Each of the plurality of pieces of PUCCH configuration information may include an index indicative of a periodicity where the channel state information is transmitted and of a subframe offset value at which the channel state information is transmitted.

Each of the plurality of pieces of PUCCH configuration information may include a first index indicative a first periodicity where the channel state information is transmitted and of a first subframe offset value at which the channel state information is transmitted, and a second subframe offset value, wherein the second subframe offset value is given as a difference to the first subframe offset value.

The plurality of PUCCH resources may be placed in different uplink subframes.

The plurality of PUCCH resources may be configured through a plurality of PUCCH resource indices received through a higher layer signal, and the plurality of PUCCH resources is placed within an identical same uplink subframe and is not overlapped with each other.

An orthogonal sequence index, a Cycle Shift (CS) index, and a physical resource index used in a PUCCH on which the channel state information is transmitted may be determined through the plurality of PUCCH resource indices.

In another aspect, a user equipment (UE) is provided. The UE comprises a Radio Frequency (RF) unit configured to transmit and receive radio signals; and a processor coupled to the RF unit, wherein the processor reserves a plurality of configured Physical Uplink Control Channel (PUCCH) resources through which channel state information can be transmitted, receives a plurality of reference signals, generates channel state information by measuring each of the plurality of reference signals, and transmits the channel state information about each of the plurality of reference signals through the plurality of PUCCH resources.

The plurality of reference signals may be received from different nodes, and the different nodes are nodes controlled by one base station.

The plurality of PUCCH resources may be configured through a plurality of pieces of PUCCH configuration information received through a higher layer signal.

Each of the plurality of pieces of PUCCH configuration information may include an index indicative of a periodicity where the channel state information is transmitted and of a subframe offset value at which the channel state information is transmitted.

Each of the plurality of pieces of PUCCH configuration information may include a first index indicative of a first periodicity where the channel state information is transmitted and of a first subframe offset value at which the channel state information is transmitted, and a second subframe offset value, wherein the second subframe offset value is given as a difference to the first subframe offset value.

The plurality of PUCCH resources may be placed in different uplink subframes.

The plurality of PUCCH resources may be configured through a plurality of PUCCH resource indices received through a higher layer signal, and the plurality of PUCCH resources is placed within an identical same uplink subframe and is not overlapped with each other.

An orthogonal sequence index, a Cycle Shift (CS) index, and a physical resource index used in a PUCCH on which the channel state information is transmitted may be determined through the plurality of PUCCH resource indices.

In a multi-node system, each node may send a different reference signal. Here, a plurality of nodes may be allocated to UE. In this case, the UE may measure a plurality of reference signals and feed back periodic channel state information. Here, unlike in the prior art, a plurality of resources through which a plurality of uplink control channels can be transmitted is allocated to the UE. The UE may efficiently feed back a plurality of pieces of periodic channel state information.

BRIEF DESCRIPTION OF THE DRAWINGS

FIG. 7 shows an example in which a resource index is mapped to physical resources.

DETAILED DESCRIPTION OF THE EMBODIMENTS

The following technologies may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is an evolution of IEEE 802.16e, and it provides backward compatibility with systems based on IEEE 802.16e. UTRA is part of a Universal Mobile Telecommunications System (UMTS). 3rd Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (LTE-A) is the evolution of LTE.

Figure 1:
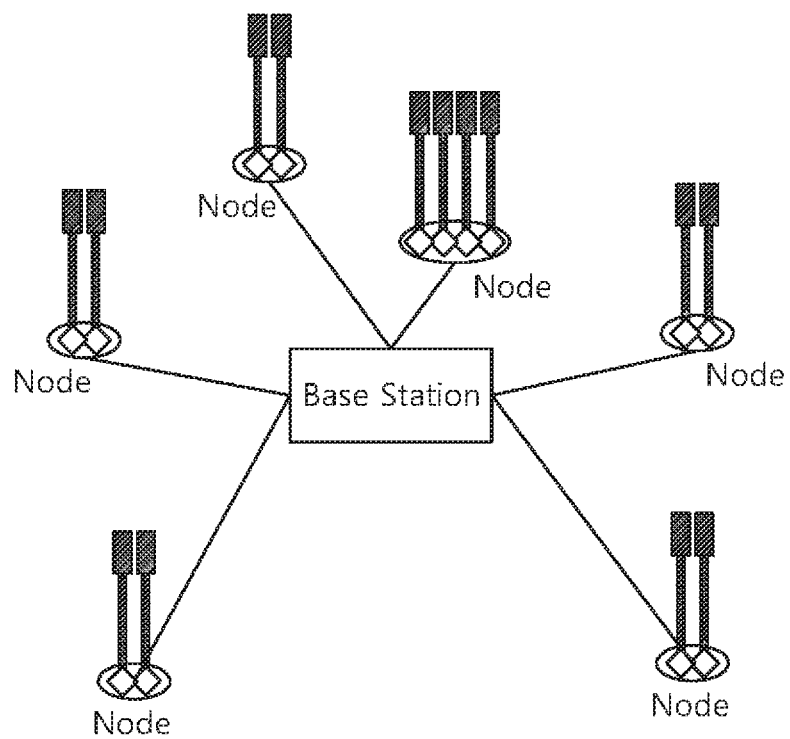
FIG. 1 shows an example of a multi-node system.

FIG. 1 shows an example of a multi-node system.

Referring to FIG. 1, the multi-node system includes a BS and a plurality of nodes.

In FIG. 1, the node may mean a macro eNB, a pico BS (PeNB), a home eNB (HeNB), a Remote Radio Head (RRH), a relay, or a distributed antenna. The node is also called a point.

In a multi-node system, if the transmission and reception of all nodes are managed by one BS controller and thus each of the nodes is operated as one cell, this system may be considered as a Distributed Antenna System (DAS) which forms one cell. In a DAS, each node may be assigned each node ID or the nodes may be operated as a set of some antennas within a cell without individual node IDs. In other words, a DAS refers to a system in which antennas (i.e., nodes) are distributed and placed at various positions within a cell and the antennas are managed by a BS. The DAS differs from a conventional centralized antenna system (CAS) in which the antennas of a BS are concentrated on the center of a cell and disposed.

In a multi-node system, if each node has each cell ID and performs scheduling and handover, it may be considered as a multi-cell (e.g., a macro cell/femto cell/pico cell) system. If the multi-cells are configured in an overlapping manner according to the coverage, this is called a multi-tier network.

Figure 2:
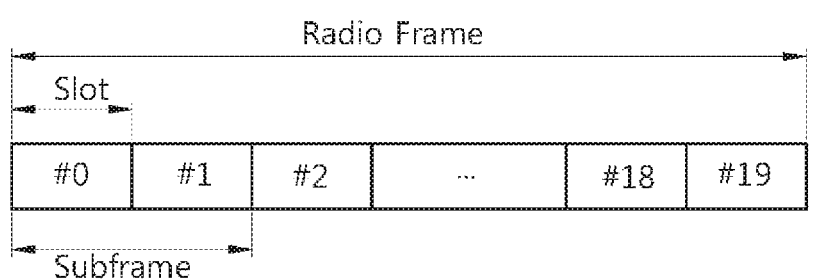
FIG. 2 shows the structure of a Frequency Division Duplex (FDD) radio frame in 3GPP LTE.

FIG. 2 shows the structure of a Frequency Division Duplex (FDD) radio frame in 3GPP LTE. This radio frame structure is called a frame structure type 1.

Referring to FIG. 2, the FDD radio frame includes 10 subframes, and one subframe is defined by two consecutive slots. The time taken for one subframe to be transmitted is called a Transmission Time Interval (TTI). The time length of a radio frame Tf=307200*Ts=10 ms and consists of 20 slots. The time length of one slot Tslot=15360*Ts=0.5 ms, and the slots are numbered 0 to 19. Downlink (DL) in which each node or BS sends a signal to UE and uplink (UL) in which UE sends a signal to each node or BS are divided in the frequency region.

Figure 3:
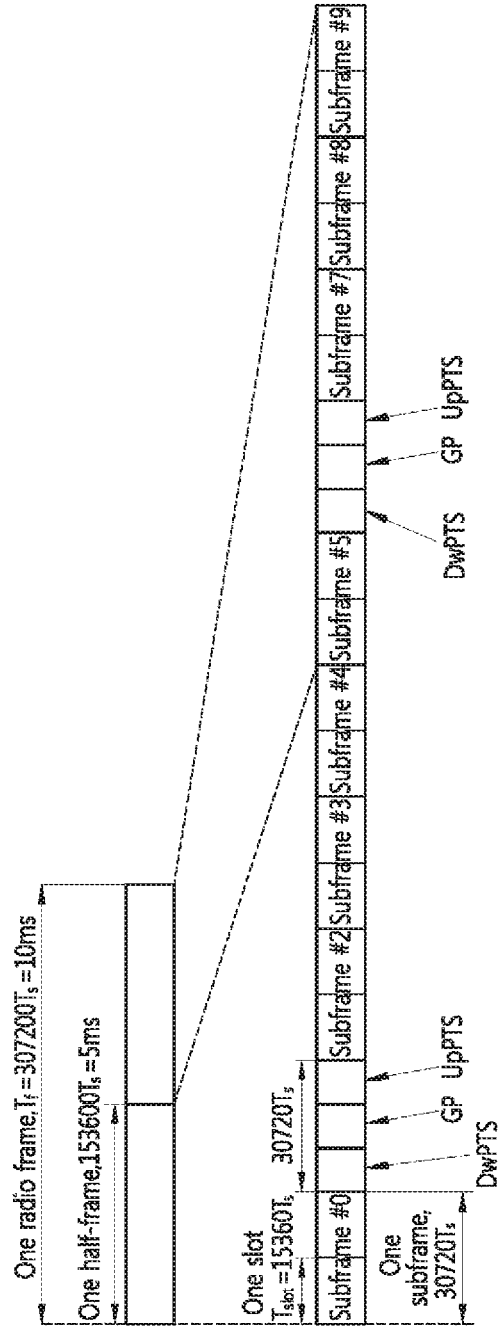
FIG. 3 shows a Time Division Duplex (TDD) radio frame structure in 3GPP LTE.

FIG. 3 shows a Time Division Duplex (TDD) radio frame structure in 3GPP LTE. This radio frame structure is called a frame structure type 2.

Referring to FIG. 3, the TDD radio frame has a length of 10 ms and consists of two half-frame each having a length of 5 ms. Furthermore, one half-frame consists of 5 subframes each having a length of 1 ms. One subframe is designated as one of a UL subframe, a DL subframe, and a special subframe. One radio frame includes at least one UL subframe and at least one DL subframe. One subframe is defined by two consecutive slots. For example, the length of one subframe may be 1 ms, and the length of one slot may be 0.5 ms.

The special subframe is a specific period for separating UL and DL from each other between a UL subframe and a DL subframe. One radio frame includes at least one special subframe. The special subframe includes a Downlink Pilot Time Slot (DwPTS), a guard period, and an Uplink Pilot Time Slot (UpPTS). The DwPTS is used for initial cell search, synchronization, or channel estimation. The UpPTS is used for channel estimation in a BS and UL transmission synchronization of UE. The guard period is a period where interference occurring in UL owing to the multi-path delay of a DL signal is removed between UL and DL.

In the FDD and TDD radio frames, one slot includes a plurality of Orthogonal Frequency Division Multiplexing (OFDM) symbols in the time domain and includes a plurality of Resource Blocks (RBs) in the frequency domain. The OFDM symbol is for representing one symbol period because 3GPP LTE uses OFDMA in DL and may be called another term, such as an SC-FDMA symbol, according to a multiple access scheme. An RB is a unit of resource allocation and includes a plurality of contiguous subcarriers in one slot.

The structure of the radio frame is only illustrative, and the number of subframes included in the radio frame, the number of slots included in the subframe, and the number of OFDM symbols included in the slot may be changed in various ways.

Figure 4:
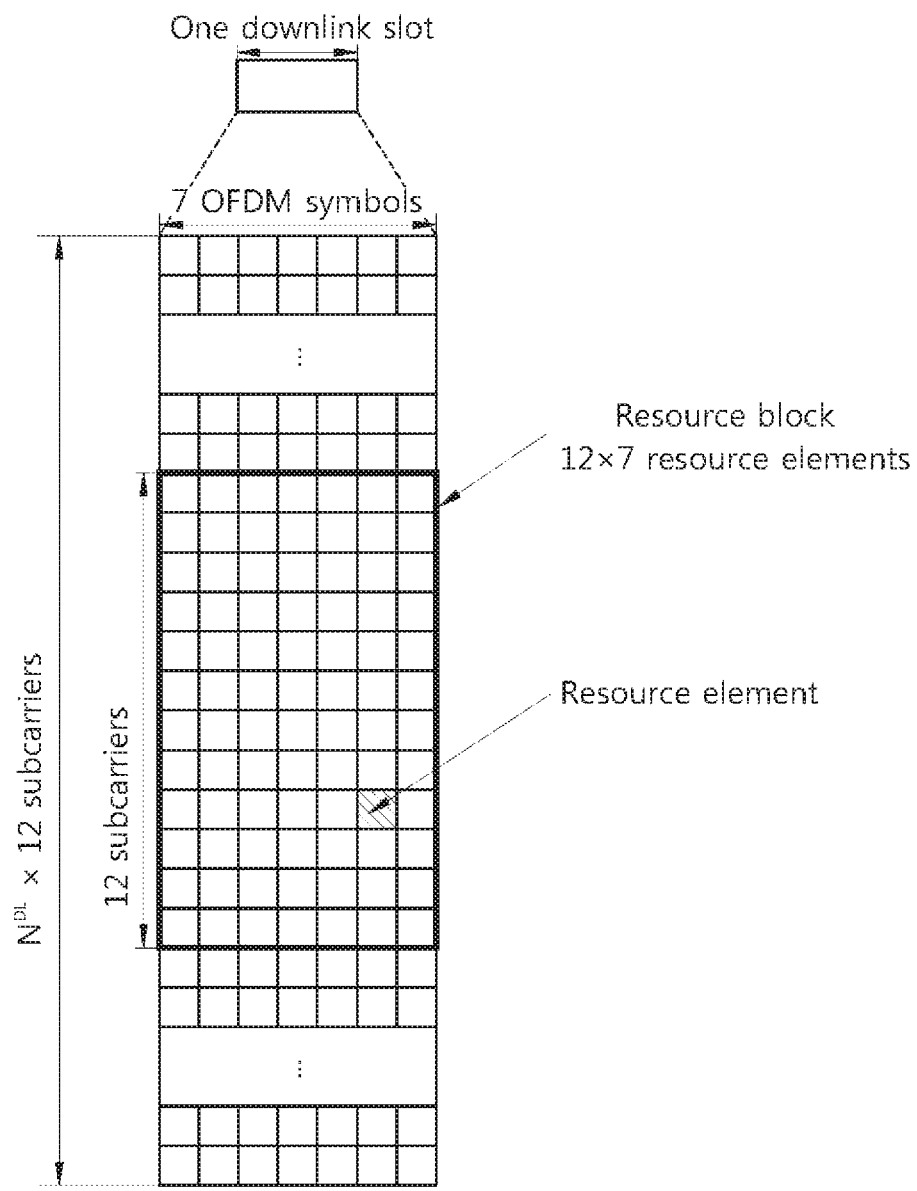
FIG. 4 illustrates a resource grid for one DL slot.

FIG. 4 illustrates a resource grid for one DL slot.

Referring to FIG. 4, one DL slot includes a plurality of OFDM symbols in the time domain. Here, one DL slot is illustrated as including 7 OFDMA symbols, and one RB is illustrated as including 12 subcarriers in the frequency domain, but not limited thereto.

Each element on the resource grid is called a resource element, and one RB includes 12×7 resource elements. The number NDL of RBs included in a DL slot depends on a DL transmission bandwidth configuration in a cell. The resource grid for the DL slot may also be applied to an UL slot.

Figure 5:
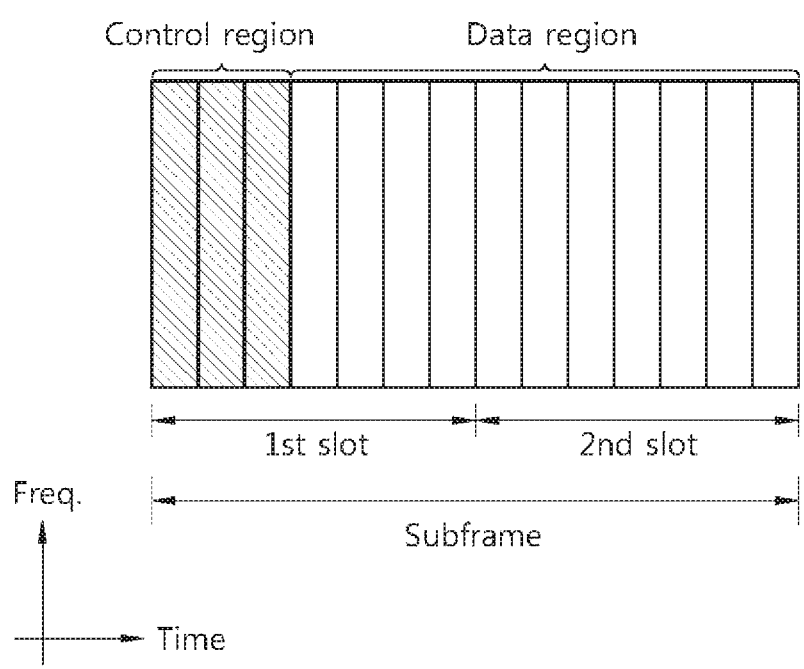
FIG. 5 shows an example of a DL subframe structure.

FIG. 5 shows an example of a DL subframe structure.

Referring to FIG. 5, the subframe includes two contiguous slots. A maximum of the former 3 OFDM symbols in the first slot of the subframe may correspond to a control region to which DL control channels are allocated, and the remaining OFDM symbols may correspond to a data region to which Physical Downlink Shared Channels (PDSCHs) are allocated.

The DL control channel includes a Physical Control Format Indicator Channel (PCFICH), a Physical Downlink Control Channel (PDCCH), a Physical Hybrid-ARQ Indicator Channel (PHICH), etc. A PCFICH transmitted in the first OFDM symbol of a subframe carries information about the number of OFDM symbols (i.e., the size of a control region) used to transmit control channels within the subframe. Control information transmitted through the PDCCH is called Downlink Control Information (DCI). DCI comprises UL resource allocation information, DL resource allocation information, a UL transmit power control command for specific UE groups, etc. DCI has various formats. A DCI format 0 is used for PUSCH scheduling. Information (field) transmitted through the DCI format 0 is as follows.

1) A flag for distinguishing the DCI format 0 and a DCI format 1A (if the flag is 0, it indicates the DCI format 0, and if the flag is 1, it indicates the DCI format 1A), 2) A hopping flag (1 bit), 3) RB designation and hopping resource allocation, 4) A modulation and coding scheme and redundancy version (5 bits), 5) A new data indicator (I bit), 6) A TPC command (2 bits) for a scheduled PUSCH, 7) A cyclic shift (3 bits) for a DM-RS, 8) An UL index, 9) a DL designation index (only in TDD), 10) A CQI request, etc. If the number of information bits in the DCI format 0 is smaller than the payload size of the DCI format 1A, '0' is padded so that the DCI format 1A is identical with the payload size.

A DCI format 1 is used for one PDSCH codeword scheduling. The DCI format 1A is used for the compact scheduling of one PDSCH codeword or a random access process. A DCI format 1B includes precoding information, and it is used for compact scheduling for one PDSCH codeword. A DCI format 1C is used for very compact scheduling for one PDSCH codeword. A DCI format 1D includes precoding and power offset information, and it is used for compact scheduling for one PDSCH codeword. A DCI format 2 is used for PDSCH designation for a closed-loop MIMO operation. A DCI format 2A is used for PDSCH designation for an open-loop MIMO operation. A DCI format 3 is used to transmit a TPC command for a PUCCH and a PUSCH through power adjustment of 2 bits. A DCI format 3A is used to transmit a TPC command for a PUCCH and a PUSCH through power adjustment of 1 bit.

A PHICH carries an Acknowledgement (ACK)/Not-Acknowledgement (NACK) signal for the Hybrid Automatic Repeat Request (HARQ) of UL data. That is, an ACK/NACK signal for UL data transmitted by UE is transmitted by a BS on a PHICH.

A PDSCH is a channel on which control information and/or data is transmitted. UE may read data transmitted through a PDSCH by decoding control information transmitted through a PDCCH.

Figure 6:
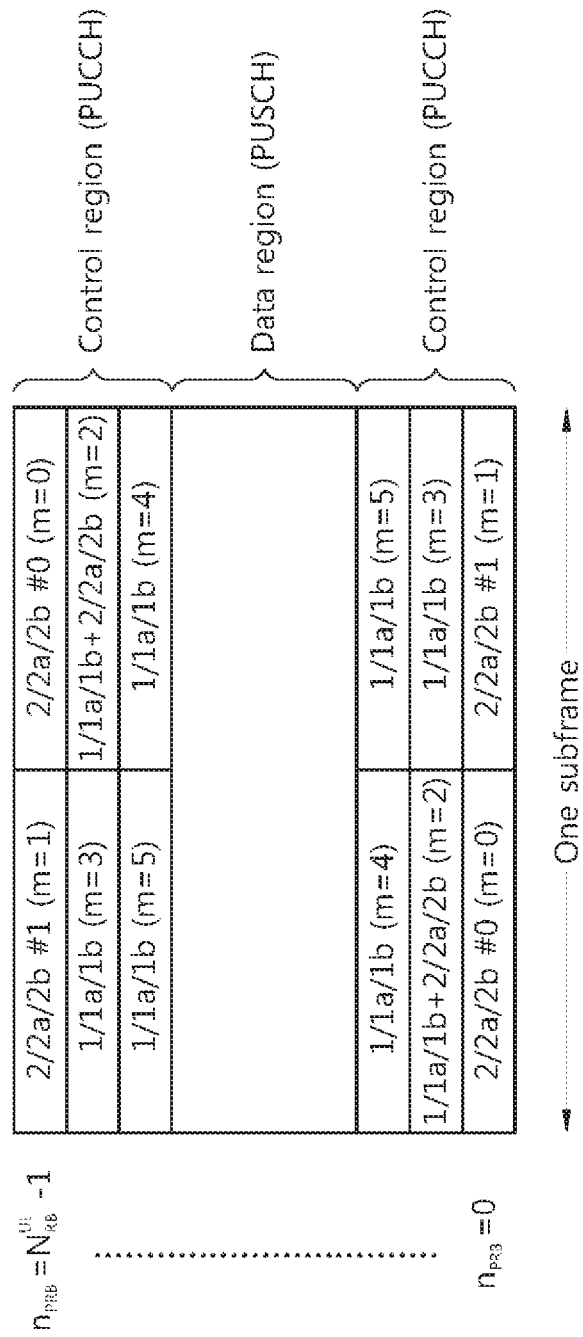
FIG. 6 shows the structure of a UL subframe.

FIG. 6 shows the structure of a UL subframe.

The UL subframe may be divided into a control region and a data region in the frequency domain. A Physical Uplink Control Channel (PUCCH) on which Uplink Control Information (UCI) is transmitted is allocated to the control region. A Physical Uplink Shared Channel (PUSCH) on which UL data and/or UL control information is transmitted is allocated to the data region. In this meaning, the control region may be called a PUCCH region, and the data region may be called a PUSCH region. UE may support the simultaneous transmission of a PUSCH and a PUCCH or may not support the simultaneous transmission of a PUSCH and a PUCCH according to configuration information indicated by a higher layer.

A PUSCH is mapped to an Uplink Shared Channel (UL-SCH), that is, a transport channel. UL data transmitted on the PUSCH may be a transport block, that is, a data block for an UL-SCH transmitted for a TTI. The transport block may be user information. Alternatively, the UL data may be multiplexed data. The multiplexed data may include a transport block and UL control information for an UL-SCH which are multiplexed. For example, UL control information multiplexed with UL data may include a Channel Quality Indicator (CQI), a Precoding Matrix Indicator (PMI), a Hybrid Automatic Repeat request (HARQ), acknowledgement/not-acknowledgement (ACK/NACK), a Rank Indicator (RI), a Precoding Type Indication (PTI), and so on. What UL control information, together with UL data, is transmitted in the data region as described above is called the piggyback transmission of UCI. Only UL control information may be transmitted in a PUSCH.

A PUCCH for one UE is allocated as a Resource Block (RB) pair in a subframe. Resource blocks belonging to a RB pair occupy different subcarriers in a first slot and a second slot. A frequency occupied by a resource block belonging to an RB pair allocated to a PUCCH is changed on the basis of a slot boundary. This is called that the frequency of the RB pair allocated to the PUCCH has been frequency-hopped at the boundary of a slot. A frequency diversity gain may be obtained when UE sends UL control information through different subcarriers according to a lapse of time.

A PUCCH carries various types of control information according to a format. A PUCCH format 1 carries a Scheduling Request (SR). Here, an On-Off Keying (OOK) scheme may be used. A PUCCH format 1a carries an Acknowledgement/Non-Acknowledgement (ACK/NACK) modulated according to a Binary Phase Shift Keying (BPSK) scheme for one codeword. A PUCCH format 1b carries ACK/NACK modulated according to a Quadrature Phase Shift Keying (QPSK) scheme for two codewords. A PUCCH format 2 carries a Channel Quality Indicator (CQI) modulated according to a QPSK scheme. PUCCH formats 2a and 2b carry a CQI and ACK/NACK. A PUCCH format 3 is modulated according to a QPSK scheme, and it may carry a plurality of ACK/NACK and SRs.

Each PUCCH format is mapped to a PUCCH region and transmitted. For example, the PUCCH formats 2/2a/2b may be mapped to the RB (in FIG. 6, m=0,1) of the edge of a band allocated to UE and then transmitted. A mixed PUCCH RB may be mapped to an RB (e.g., m=2) adjacent in the direction of the center of the band in the RB to which the PUCCH formats 2/2a/2b are allocated and then transmitted. The PUCCH formats 1/1a/1b on which an SR and ACK/NACK are transmitted may be disposed in an RB having m=4 or m=5. UE may be informed of the number N(2)RB of RBs that may be used in the PUCCH formats 2/2a/2b on which a CQI may be transmitted through a broadcasted signal.

All PUCCH formats use the Cyclic Shift (CS) of a sequence in each OFDM symbol. The CS sequence is generated by cyclically shifting a base sequence by a specific CS amount. The specific CS amount is indicated by a CS index.

An example in which the base sequence ru(n) is defined is as follows.

$$r_u(n) = e^{jb(n)\pi/4}$$ [Equation 1]

In Equation 1, u is a root index, n is an element index, 0≤n≤N−1, and N is the length of the base sequence. b(n) is defined in section 5.5 of 3GPP TS 36.211 V8.7.0.

The length of the sequence is equal to the number of elements included in the sequence. u may be defined by a cell identifier (ID), a slot number within a radio frame, etc. Assuming that a base sequence is mapped to one resource block within the frequency domain, the length N of the base sequence is 12 because one resource block includes 12 subcarriers. A different base sequence is defined according to a different root index.

A cyclic-shifted sequence r(n, Ics) may be generated by cyclically shifting the base sequence r(n) as in Equation 2 below.

$$r(n, I_{cs}) = r(n) \cdot \exp\left(\frac{j2\pi I_{cs}n}{N}\right), 0 \leq I_{cs} \leq N-1$$ [Equation 2]

In Equation 2, Ics is a CS index indicating a CS amount (0≤Ics≤N−1).

Available CS indices of the base sequence refer to a CS index that may be derived from the base sequence according to a CS interval. For example, if the length of a base sequence is 12 and a CS interval is 1, a total number of available CS indices of the base sequence is 12. In contrast, if the length of a base sequence is 12 and a CS interval is 2, a total number of available CS indices of the base sequence is 6. The orthogonal sequence index i, the CS index Ics, and the resource block index m are parameters necessary to configure a PUCCH and are resources used to distinguish PUCCHs (or UEs) from each other.

In 3GPP LTE, in order for UE to obtain 3 parameters for configuring a PUCCH, resource indices (also called a PUCCH resource index) n(1)PUCCH n(2)PUCCH are defined. Here, n(1)PUCCH is a resource index for the PUCCH formats 1/1a/1b, and n(2)PUCCH is a resource index for the PUCCH formats 2/2a/2b. A resource index n(1)PUCCH=nCCE+N(1)PUCCH, and nCCE is the number of a first CCE which is used to transmit a relevant DCI (i.e., the index of a first CCE which is used for relevant PDCCH), and N(1)PUCCH is a parameter that a BS informs UE the parameter through a high layer message. Detailed contents are as follows.

---

SPS(semi-persistent scheduled)-UE: defined by RRC
Scheduling request: defined by RRC
Otherwise: $n_{PUCCH}^{(1)} = n_{CCE} + N_{PUCCH}^{(1)}$
(refer TS36.213 subclause 10.1[2])
$n_{CCE}$: First CCE(control channel elements) index of PDCCH
$N_{PUCCH}^{(1)} = c \cdot N_{sc}^{RB}/\Delta_{shift}^{PUCCH}$
$c = \begin{cases} 3 & \text{normal cyclic prefix} \\ 2 & \text{extended cyclic prefix} \end{cases}$
$N_{sc}^{RB} = 12$
$\Delta_{shift}^{PUCCH} \in \{1,2,3\}$

--- n(2)PUCCH is given a UE-specific way and is semi-statically configured by a higher layer signal, such as RRC. In LTE, n(2)PUCCH is included in an RRC message called 'CQI-ReportConfig'.

UE determines an orthogonal sequence index, a CS index, etc. using the resource indices n(1)PUCCH, n(2)PUCCH.

UE transmits a PUCCH using physical resources mapped to a resource index.

FIG. 7 shows an example in which a resource index is mapped to physical resources.

UE calculates a resource block index m based on a resource index, allocates physical resources according to a PUCCH format, and transmit the PUCCH. The following relationship exists between a resource index allocated to each UE and a mapped physical resource block.

---

System Parameters $\Delta_{shift}^{PUCCH} = 1$ → 12 (available cyclic shift value)
c = 3 → Normal CP
$N_{PUCCH}^{(1)} = c \cdot N_{sc}^{RB}/\Delta_{shift}^{PUCCH} = 36$
$N_{RB}^{(2)} = 2 \cdot N_{sc}^{RB} = 24$ → Bandwidth available for use by PUCCH formats 2/2a/2b (expressed in multiple of $N_{sc}^{RB}$)
$N_{cs}^{(1)} = 7$ → Number of cyclic shifts used for PUCCH formats 1/1a/1b in a resource block with a mix of formats 1/1a/1b and 2/2a/2b

---

In a multi-node system, a different reference signal may be transmitted from each node or each node group. First, a reference signal is described.

In LTE Rel-8, for channel measurement and channel estimation for a PDSCH, a Cell-specific Reference Signal (CRS) is used.

Figure 8:
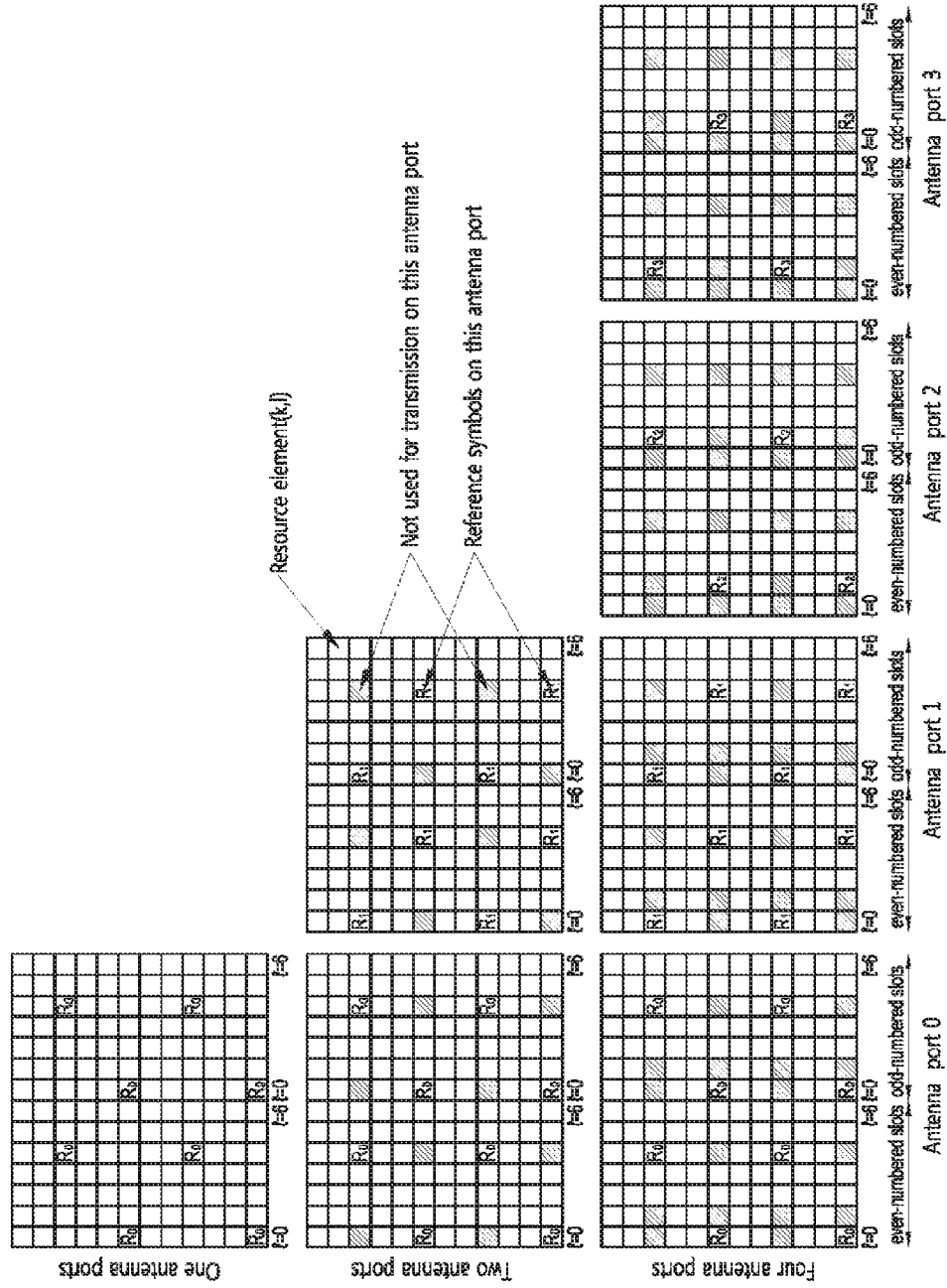
FIG. 8 shows the mapping of a CRS in a normal cyclic prefix (CP).

FIG. 8 shows the mapping of a CRS in a normal cyclic prefix (CP).

Referring to FIG. 8, in case of multiple antenna transmission using a plurality of antennas, a resource grid exists in each antenna, and at least one reference signal for an antenna may be mapped to each resource grid. A reference signal for each antenna includes reference symbols. In FIG. 8, Rp indicates the reference symbol of an antenna port p (p∈{0, 1, 2, 3}). R0 to R3 are not mapped to overlapping resource elements.

In one OFDM symbol, each Rp may be placed at 6 subcarrier intervals. The number of R0s and the number of R1s within a subframe are identical with each other, and the number of R2s and the number of R3s within a subframe are identical with each other. The number of R2s or R3s within a subframe is smaller than the number of R0s or R1s within the subframe. Rp is not used for any transmission through other antennas other than a No. p antenna.

In LTE-A, for channel measurement and channel estimation for a PDSCH, a Channel Status Information Reference Signal (CSI-RS) may be used separately from a CRS. The CSI-RS is described below.

A CSI-RS, unlike a CRS, includes a maximum of 32 different configurations in order to reduce Inter-Cell Interference (ICI) in a multi-cell environment including heterogeneous network environments.

A configuration for the CSI-RS is different according to the number of antenna ports within a cell and is given so that maximum different configurations between adjacent cells are configured. The CSI-RS is divided according to a CP type. The configuration for the CSI-RS is divided into a configuration applied to both a frame structure type I and a frame structure type 2 and a configuration applied to only the frame structure type 2 according to a frame structure type (the frame structure type 1 is FDD, and the frame structure type 2 is TDD).

The CSI-RS, unlike the CRS, supports a maximum of 8 antenna ports, and an antenna port p is supported by {15}, {15, 16}, {15, 16, 17, 18}, {15, ..., 22}. That is, the CSI-RS supports 1, 2, 4, or 8 antenna ports. An interval Δf between subcarriers is defined only for 15 kHz.

A sequence rl,ns(m) for the CSI-RS is generated as in Equation below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$
$$m = 0, 1, \ldots, N_{RB}^{max,DL} - 1$$

where, $c_{init} =$ $$2^{10} \cdot (7 \cdot (n_s + 1) \cdot l + 1) \cdot (2 N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 3, ns is a slot number within a radio frame, and 1 is an OFDM symbol number within the slot. c(i) is a pseudo random sequence and is started from each OFDM symbol as cinit. NIDcell indicates a physical layer cell ID.

In subframes configured to transmit a CSI-RS, a reference signal sequence rl,ns(m) is mapped to a complex value modulation symbol ak,l(p) used as a reference symbol for an antenna port p.

A relationship between rl,ns(m) and ak,l(p) is defined as in Equation below.

$$a_{k,l}^{(p)} = w_{l''} \cdot r_{l,n_s}(m') \quad \text{[Equation 4]}$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations } 0\text{--}19, \text{ normal cyclic prefix} \\ 2l'' & CSI \text{ reference signal configurations } 20\text{--}31, \text{ normal cyclic prefix} \\ l'' & CSI \text{ reference signal configurations } 0\text{--}27, \text{ extended cyclic prefix} \end{cases}$$

$$w_{l'} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 4, (k', l') and ns are given in Table 1 and Table 2 below. A CSI-RS may be transmitted in a DL slot in which (ns mod 2) meets the conditions of Table 1 and Table 2 (mod means a modular operation, that is, mod means the remainder obtained by dividing ns by 2).

Table below shows a CSI-RS configuration for a normal CP.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table below shows a CSI-RS configuration for an extended CP.

TABLE 2

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |

TABLE 2-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

A subframe including a CSI-RS must satisfy Equation below.

$$(10n_f + \lfloor n_s/2 \rfloor - \Delta_{CSI-RS}) \bmod T_{CSI-RS} = 0. \quad \text{[Equation 5]}$$

Furthermore, the CSI-RS may be transmitted in a subframe satisfying the condition of Table 3.

Table 3 shows a CSI-RS subframe configuration related to a duty cycle. nf is a system frame number.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

In Table 3, 'CSI-RS-SubframeConfig', that is, ICSI-RS is a value given by a higher layer, and it indicates a CSI-RS subframe configuration. TCSI-RS indicates a cell-specific subframe configuration period, and ΔCSI-RS indicates a cell-specific subframe offset. A CSI-RS supports five types of duty cycles according to a CQI/CSI feedback, and it may be transmitted with a different subframe offset in each cell.

Figure 9:
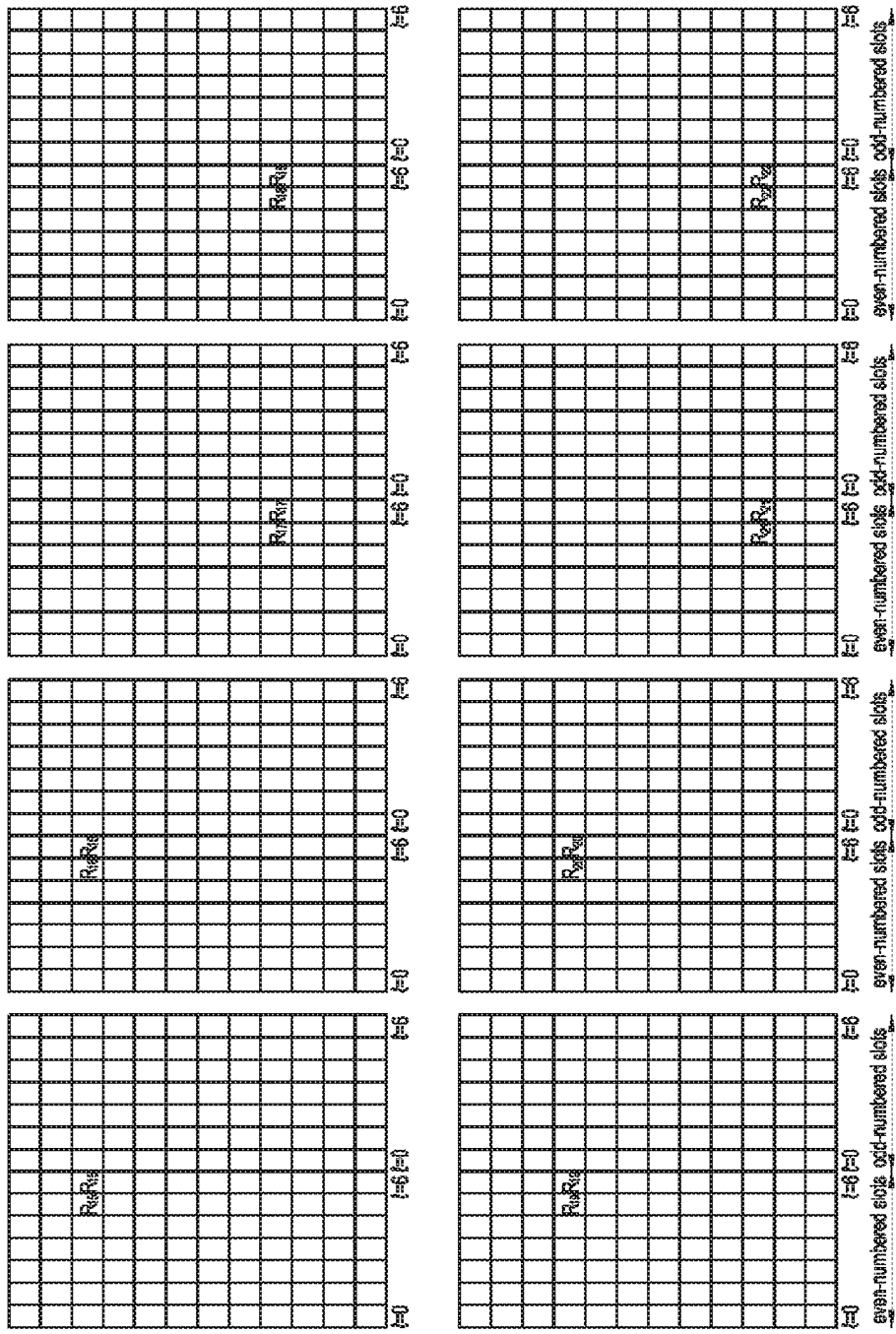
FIG. 9 shows the mapping of a CSI-RS for a CSI-RS configuration 0 in a normal CP.

FIG. 9 shows the mapping of a CSI-RS for a CSI-RS configuration 0 in a normal CP.

Referring to FIG. 9, two antenna ports transmit a CSI-RS using, for example, two same contiguous resource elements for p={15, 16}, {17, 18}, {19, 20}, {21, 22}, but using an Orthogonal Cover Code (OCC).

A plurality of CSI-RS configurations can be used in a cell. In this case, one CSI-RS configuration in which UE assumes non-zero transmit power and one or non CSI-RS configuration in which UE assumes zero transmit power may be configured.

A CSI-RS is not transmitted in the following cases.
1. A special subframe of the frame structure type 2
2. When it is collided with a synchronization signal, a physical broadcast channel(PBCH), or a system information block (SIB)
3. A subframe in which a paging message is transmitted A resource element (k,l) used to transmit a CSI-RS for a specific antenna port of a set S is not used to transmit a PDSCH for a specific antenna port in the same slot. Furthermore, the resource element (k,l) is not used to transmit a CSI-RS for another specific antenna port other than the set S in the same slot. Here, antenna ports included in the set S include {15, 16}, {17, 18}, {19, 20}, and {21, 22}.

Parameters necessary to transmit the CSI-RS include 1. a CSI-RS port number, 2. CSI-RS configuration information, 3. a CSI-RS subframe configuration ICSI-RS, 4. a subframe configuration periodicity TCSI-RS, 5. a subframe offset ΔCSI-RS, and so on. The parameters are cell-specific and are given through higher layer signaling.

A BS may apply a reference signal, such as a CRS and a CSI-RS, so that UE may identify each node in a multi-node system.

UE may measure the reference signal, generate Channel State Information (CSI), and then report or feed back the CSI to a BS or a node. CSI includes a CQI, a PMI, an RI, etc.

A method of transmitting CSI includes periodic transmission and aperiodic transmission. In the periodic transmission method, CSI may be transmitted through a PUCCH or a PUSCH. The aperiodic transmission method is performed in such a manner that, if more precise CSI is necessary, a BS requests CSI from UE. The aperiodic transmission method is performed through a PUSCH. Since a PUSCH is used, capacity is greater and detailed channel state reporting possible. If periodic transmission and aperiodic transmission collide with each other, only aperiodic transmission is performed.

An aperiodic CSI feedback is performed when there is a request from a BS. If UE is accessed, a BS may request a CSI feedback from the UE when sending a random access response grant to the UE. In some embodiments, a BS may request a CSI feedback from UE by using a DCI format in which UL scheduling information is transmitted. A CSI request field requesting a CSI feedback comprises 1 bit or 2 bits. If the CSI request field is 1 bit, in case of '0', a CSI report is not triggered. In case of '1', a CSI report is triggered. In case of 2 bits, the following Table is applied.

TABLE 4

| Value of CSI request field | Description |
|---|---|
| '00' | No aperiodic CSI report is triggered |
| '01' | Aperiodic CSI report triggered for serving cell $c$ |
| '10' | Aperiodic CSI report is triggered for a 1st set of serving cells configured by higher layers |
| '11' | Aperiodic CSI report is triggered for a 2nd set of serving cells configured by higher layers |

When a CSI report is triggered by a CSI request field, UE feeds back CSI through PUSCH resources designated in the DCI format 0. Here, what CSI will be fed back is determined according to a reporting mode. For example, which one of a wideband CQI, a UE-selective CQI, and a higher layer configuration CQI will be fed back is determined according to a reporting mode. Furthermore, what kind of a PMI will be fed back is also determined along with a CQI. A PUSCH reporting mode is semi-statically configured through a higher layer message, and an example thereof is listed in Table 5 below.

TABLE 5

|  | PMI Feedback Type | | |
|---|---|---|---|
|  | No PMI | Single PMI | Multiple PMI |
| PUSCH CQI Feedback Type Wideband (wideband CQI) |  |  | Mode 1-2 |
| UE Selected (subband CQI) | Mode 2-0 |  | Mode 2-2 |
| Higher Layer-configured (subband CQI) | Mode 3-0 | Mode 3-1 |  |

Unlike aperiodic CSI feedback transmitted only when it is triggered through a PDCCH, periodic CSI feedback is semi-statically configured through a higher layer message. The periodicity Npd and subframe offset NOFFSET,CQI of periodic CSI feedback are transferred to UE as a higher layer message (e.g., an RRC message) through a parameter called 'cqi-pmi-ConfigIndex' (i.e., ICQI/PMI). A relationship between the parameter ICQI/PMI and the periodicity and subframe offset is listed in Table 6 in case of FDD and in Table 7 in case of TDD.

TABLE 6

| $I_{CQI/PMI}$ | Value of $N_{pd}$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ |  | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ |  | Reserved |

TABLE 7

| $I_{CQI/PMI}$ | Value of $N_{pd}$ | Value of $N_{OFFSET, CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ |  | Reserved |

A periodic PUCCH reporting mode is listed in Table below.

TABLE 8

|  |  | PMI Feedback Type | |
|---|---|---|---|
|  |  | No PMI | Single PMI |
| PUCCH CQI Feedback Type | Wideband (wideband CQI) | Mode1-0 | Mode1-1 |
|  | UE selected (subband CQI) | Mode2-0 | Mode2-1 |

UE must measure the reference signal of a specific resource region in order to feed back CSI, for example, CQI. Resources that must be measured in order to generate CQI are called CQI reference resources. It is assumed that UE feeds back CQI in a UL subframe n. Here, a CQI reference resource is defined as a group of DL physical resource blocks corresponding to a frequency band which is related to a CQI value in the frequency domain and is defined as one DL subframe n-nCQI_ref in the time domain.

In periodic CQI feedback, nCQI_ref is the smallest value from among 4 or more values corresponding to a valid DL subframe. In aperiodic CQI feedback, nCQI_ref indicates a valid DL subframe including a UL DCI format including a relevant CQI request.

In aperiodic CQI feedback, if the DL subframe n-nCQI_ref is received after a subframe including a CQI request included in a random access response grant, nCQI_ref is 4, and the DL subframe n-nCQI_ref corresponds to a valid DL subframe.

A DL subframe is considered as a valid DL subframe to a UE if it meets the following conditions.

1. The DL subframe is configured for the UE, 2. a transport mode 9 is excluded, and the DL subframe is not a Multicast-Broadcast Single Frequency Network (MBSFN) subframe, 3. the length of a DwPTS field of the DL subframe is not 7680 Ts or smaller, 4. the DL subframe should not correspond to a configured measurement gap for the UE.

If a valid DL subframe for CQI reference resources does not exist, CQI feedback is omitted in UL subframe n.

In the layer domain, CQI reference resources are defined by any RI and PMI value on which the CQI is conditioned.

In CQI reference resources, UE is operated under the following assumption in order to derive a CQI index.

1. In CQI reference resources, the first 3 OFDM symbols are occupied by a control signal.

2. In CQI reference resources, there is no resource element used by a Primary Synchronization Signal (PSS), a Secondary Synchronization Signal (SSS), or a Physical Broadcast Channel (PBCH).

3. In CQI reference resources, the CP length of a non-MBSFN subframe is assumed.

4. Redundancy version 0

Table below shows the transmission modes of a PDSCH assumed for CQI reference resources.

TABLE 9

| Transmission mode | Transmission Scheme of PDSCH |
|---|---|
| 1 | Single-antenna port, port 0 |
| 2 | Transmit diversity |
| 3 | Transmit diversity if an associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, single-antenna port, port 0; otherwise transmit diversity |
| 8 | If UE is configured without PMI/RI reporting: if the number of PBCH antenna ports is one, single-antenna port, port 0; otherwise transmit diversity If UE is configured with PMI/RI reporting: closed-loop spatial multiplexing |
| 9 | Closed-loop spatial multiplexing with up to 8 layer transmission, ports 7-14 |

In the transmission mode 9 and its feedback reporting mode, UE performs channel measurement for calculating CQI based on only a CSI-RS. In the remaining transmission modes and relevant reporting modes, UE performs channel measurement for calculating CQI based on a CRS.

A CQI index fed back by UE and its meanings are listed in Table below.

TABLE 10

| CQI index | modulation | code rate × 1024 | efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

As described above, in a conventional periodic CQI feedback or reporting method, a BS semi-statically configures the periodicity Npd and subframe offset NOFFSET,CQI of periodic CQI feedback through a parameter called 'cqi-pmi-ConfigIndex' (i.e., ICQI/PMI) through a higher layer signal. Thus, UE measures a CRS or a CSI-RS in CQI reference resources and sends CQI through the PUCCH of a UL subframe configured by a parameter (i.e., ICQI/PMI). Here, there is a precondition that the UE measures one reference signal and sends CQI through one PUCCH. In a multi-node system, however, a plurality of nodes or node groups may be allocated to UE, and a different reference signal may be used for each node or node group. In this case, UE may measure a plurality of reference signals and report CSI (e.g., CQI) about each reference signal.

Figure 10:
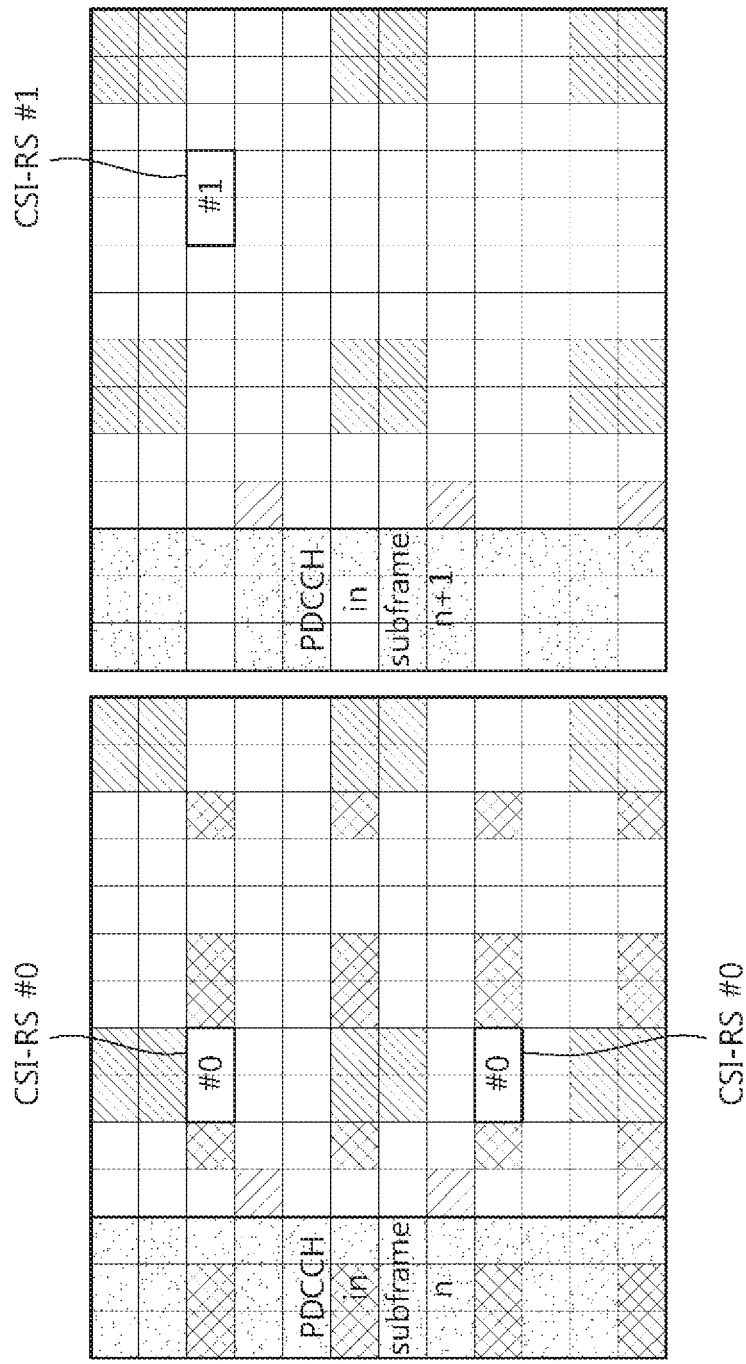
FIG. 10 illustrates a plurality of CSI-RSs that should be measured by one UE.

FIG. 10 illustrates a plurality of CSI-RSs that should be measured by one UE.

Referring to FIG. 10, a CSI-RS #0 and a CSI-RS #1 may be configured for UE. The CSI-RS #0 may be a CSI-RS transmitted by a node #N, and the CSI-RS #1 may be a CSI-RS transmitted by a node #M.

The transmission periodicity of the CSI-RS #0 may be identical with the transmission periodicity of the CSI-RS #1. For example, the CSI-RS #0 may be transmitted in a subframe n+10m (m is 0 or a natural number). The CSI-RS #1 may be transmitted in a subframe n+1+10m.

As shown in FIG. 10, CSI-RSs transmitted in different subframes may be configured for the same UE, but not limited thereto. That is, a plurality of CSI-RSs transmitted in the same subframe may be configured for the same UE.

Figure 11:
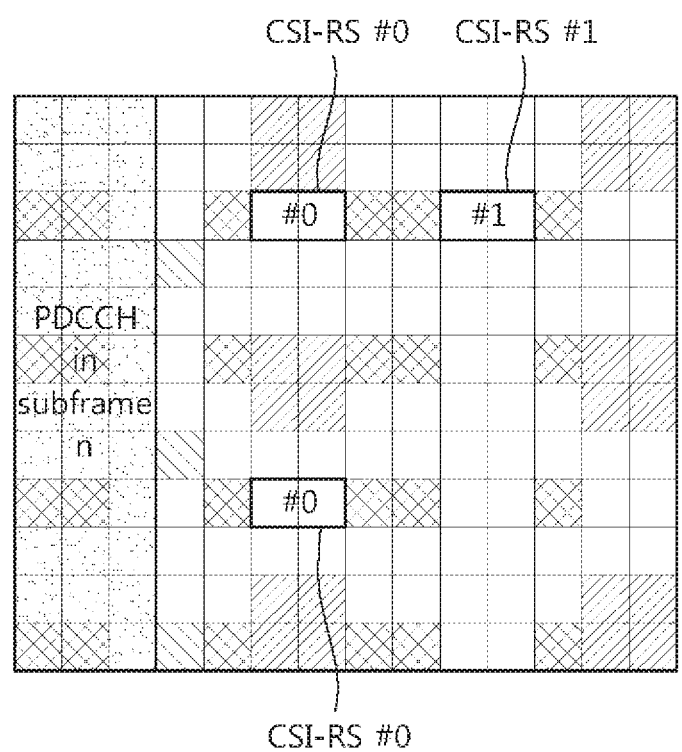
FIG. 11 shows an example in which a plurality of CSI-RSs transmitted in the same subframe is configured for the same UE.

FIG. 11 shows an example in which a plurality of CSI-RSs transmitted in the same subframe is configured for the same UE.

Referring to FIG. 11, CSI-RS #0 and #1 are transmitted in a subframe n. The CSI-RS #0 may be a CSI-RS transmitted by a node #N, and the CSI-RS #1 may be a CSI-RS transmitted by a node #M.

As described above, if a plurality of CSI-RSs is configured for the same UE, how to transmit the CSI is problematic.

Figure 12:
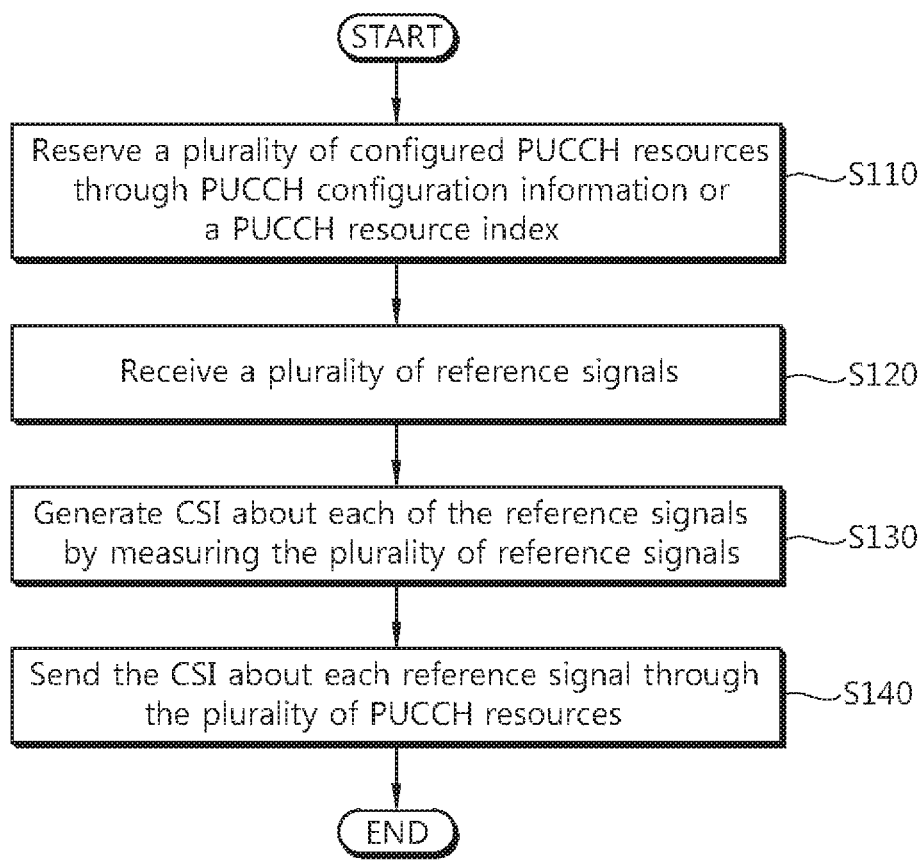
FIG. 12 shows a method in which UE sends CSI according to an embodiment of the present invention.

FIG. 12 shows a method in which UE sends CSI according to an embodiment of the present invention.

Referring to FIG. 12, a plurality of PUCCH resources is configured for UE through PUCCH configuration information or a PUCCH resource index (S110).

The PUCCH configuration information or the PUCCH resource index may be received through a higher layer signal, such as an RRC message, and PUCCH resources through which CSI will be transmitted may be semi-statically configured.

The UE receives a plurality of reference signals (S120). The UE may receive the plurality of reference signals from a plurality of nodes or a node group. The reference signal may be a CSI-RS, and it may have a different CSI-RS configuration.

The UE generates CSI about each of the reference signals by measuring the plurality of reference signals (S130). The CSI may be CQI, but not limited thereto. It is evident that the CSI may include an RI, a PMI, etc.

The UE sends the CSI about each reference signal through the plurality of PUCCH resources (S140).

A process in which a plurality of PUCCH resources is configured for UE through PUCCH configuration information or a PUCCH resource index and the UE transmits CSI is described in detail below.

The PUCCH configuration information may be, for example, 'cqi-pmi-ConfigIndex' (i.e., ICQI/PMI). A BS may configure a plurality of ICQI/PMI for the same UE. Thus, the UE may transmit CSI through the periodicity Npd of periodic CSI feedback, determined according to each ICQI/PMI, and the PUCCH of a UL subframes corresponding to a subframe offset NOFFSET,CQI. That is, a plurality of PUCCH resources is configured for different subframes.

In some embodiments, the BS may provide UE with one ICQI/PMI as in the prior art, but may signalize a subframe offset NOFFSET,CQI for additional PUCCHs. For example, the BS may signalize ICQI/PMI_1 and NOFFSET,CQI_2. In this case, UE determines the periodicity Npd_1 of periodic CSI feedback and a subframe offset NOFFSET,CQI_1 based on the ICQI/PMI_1. If a UL subframe determined based on the ICQI/PMI_1 is a subframe 1, a subframe offset value based on the subframe 1 may be known through the NOFFSET,CQI_2. The UE may transmit additional PUCCHs through a subframe 2 spaced apart from the subframe 1 by the subframe offset value. The additionally provided subframe offset NOFFSET,CQI_2 may be given in a form, such as NOFFSET,CQI_1, and may be given as a difference between the subframe offset NOFFSET,CQI_2 and the subframe offset NOFFSET,CQ_1 according to the ICQI/PMI_1. That is, assuming that a CSI feedback periodicity included in 'cqi-pmi-ConfigIndex'(ICQI/PMI) is P, a subframe offset value is N0, and an additional subframe offset value is N1, periodic CSI feedback having the same periodicity P through the additional subframe offset value, but having a value N0+N1 as a subframe offset value may be requested from the UE.

Figure 13:
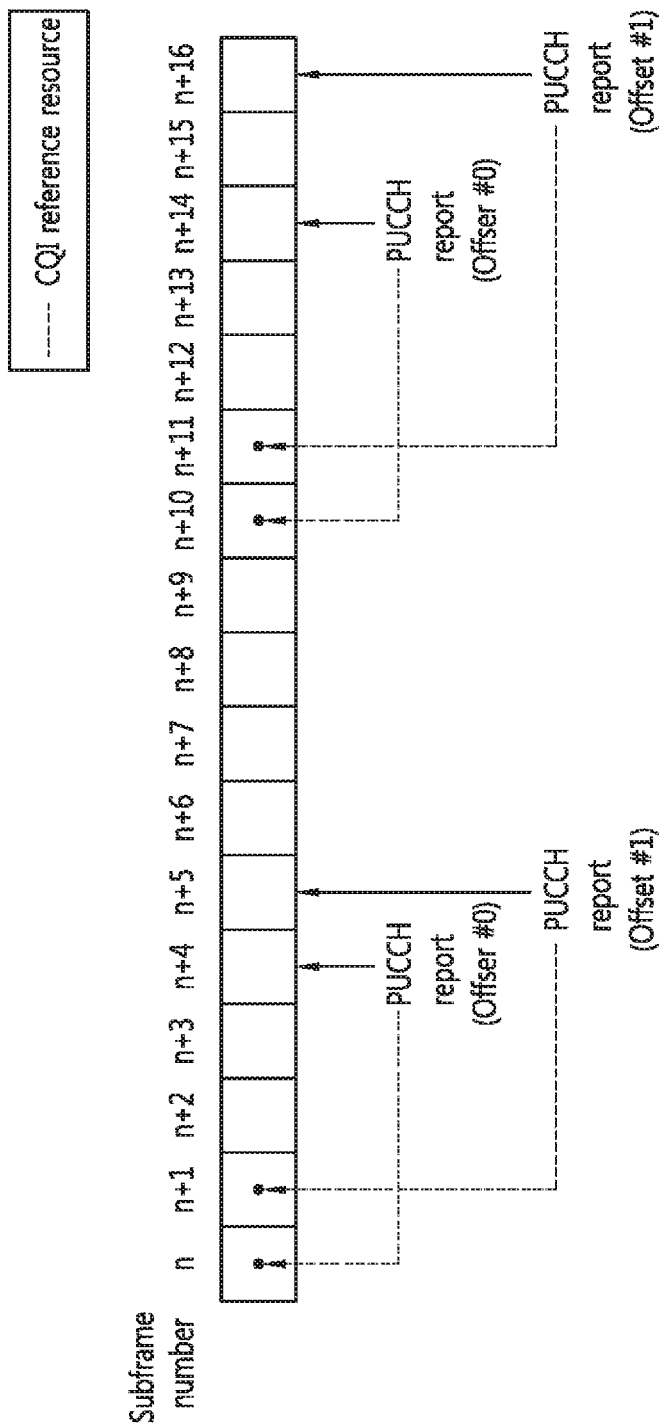
FIG. 13 shows an example in which CSI about each of a plurality of CSI-RSs configured for UE is transmitted through a plurality of PUCCHs existing in a plurality of subframes.

FIG. 13 shows an example in which CSI about each of a plurality of CSI-RSs configured for UE is transmitted through a plurality of PUCCHs existing in a plurality of subframes. A plurality of PUCCH resources has been semi-statically configured for the UE through a plurality of ICQI/PMI or one ICQI/PMI and an additional subframe offset value.

Referring to FIG. 13, the UE feeds back CSI about a CSI-RS, received in a subframe n+10m (m is 0 or a natural number), through a PUCCH of a subframe n+4+10m. Furthermore, CSI about a CSI-RS transmitted in a subframe n+1+10m is fed back through a PUCCH of a subframe n+6+10m. As described above, CSI about each CSI-RS may be reported through a plurality of PUCCHs as described above.

FIG. 13 illustrates an example in which a plurality of PUCCHs for reporting CSI exists in different subframes, but not limited thereto. That is, the plurality of PUCCHs may exist in the same subframe. In this case, a BS may provide UE with a plurality of PUCCH resource indices n(2) PUCCH. The UE may receive the plurality of PUCCH resource indices from the BS in order to transmit a plurality of PUCCHs within the same subframe.

For example, the BS may designate two different PUCCH resource indices n(2)PUCCH_1 and n(2)PUCCH_2 for the UE through a higher layer signal. It is assumed that the two PUCCH resource indices sequentially designate PUCCHs corresponding to resource block indices m=0 and m=1. Thus, the UE may feed back CSI about a CSI-RS #0 through a PUCCH corresponding to m=0 (i.e., a PUCCH indicated by n(2)PUCCH_1) and feed back CSI about the CSI-RS #1 through a PUCCH corresponding to m=1 (i.e., a PUCCH indicated by n(2)PUCCH_2).

Figure 14:
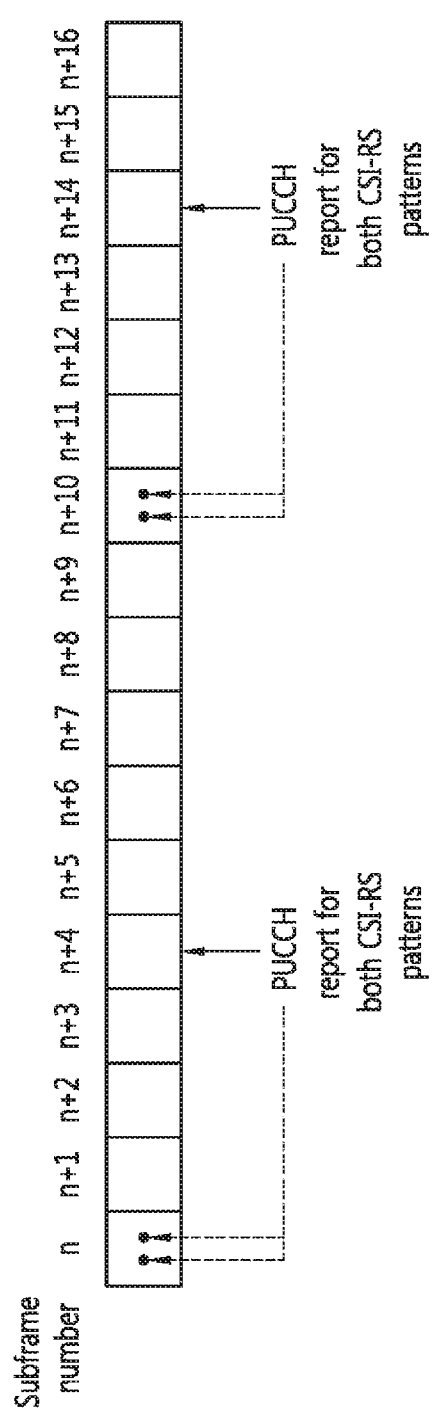
FIG. 14 shows an example in which CSI about each of a plurality of CSI-RSs configured for the same UE is fed back through a plurality of PUCCHs of the same subframe.

FIG. 14 shows an example in which CSI about each of a plurality of CSI-RSs configured for the same UE is fed back through a plurality of PUCCHs of the same subframe.

Referring to FIG. 14, the UE may receive a plurality of CSI-RSs in a subframe n+10m (m is 0 or a natural number). The UE may send CSI about each of the plurality of CSI-RSs in a subframe n+4+10m through a different PUCCH.

Figure 15:
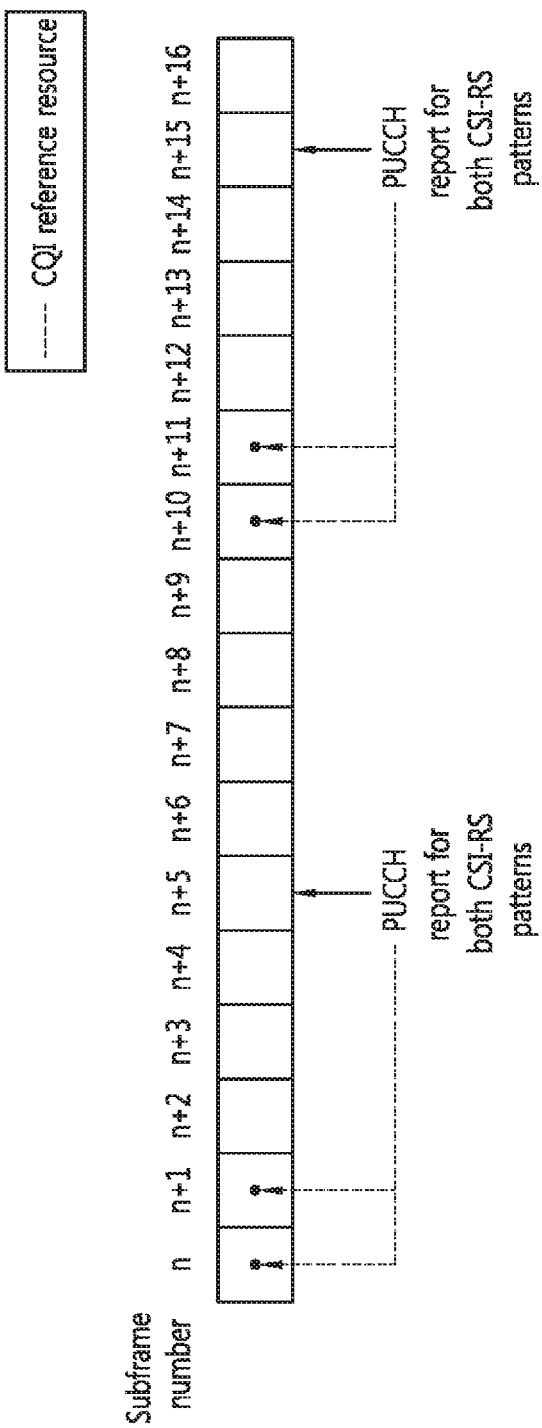
FIG. 15 shows another example in which CSI about each of a plurality of CSI-RS configured for the same UE is fed back in a plurality of PUCCHs of the same subframe.

FIG. 15 shows another example in which CSI about each of a plurality of CSI-RS configured for the same UE is fed back in a plurality of PUCCHs of the same subframe.

Referring to FIG. 15, the UE may receive a plurality of CSI-RSs in subframes n+10m and n+1+10m (m is 0 or a natural number). The UE may transmit CSI about each of a plurality of CSI-RS in a subframe n+5+10m through a different PUCCH.

In the present invention, in order to help understanding of the contents, a multi-node system has been described as an example, but the present invention is not limited thereto. That is, the present invention may be applied to an example in which multiple CSI-RS configurations are applied in a specific system. Furthermore, a CSI has been chiefly described as an example of CSI, but an RI, a PMI, etc. may also be used as CSI.

Figure 16:
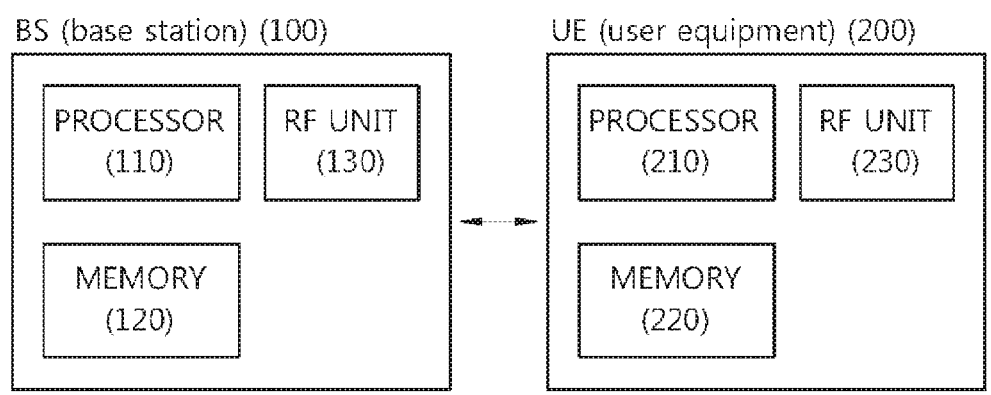
FIG. 16 is a block diagram showing a BS and UE.

FIG. 16 is a block diagram showing a BS and UE.

The BS 100 includes a processor 110, memory 120, and a Radio Frequency (RF) unit 130. The processor 110 implements the proposed functions, processes and/or methods. The processor 110 configures a plurality of PUCCH resources for UE through PUCCH configuration information or a PUCCH resource index. Furthermore, the processor 110 sends a reference signal (e.g., a CSI-RS) to UE through at least two of a plurality of nodes controlled by the BS. Next, the BS may directly receive periodic CSI about each reference signal from UE or may receive the periodic CSI from the UE through a specific node. The periodic CSI may be utilized for the scheduling of the BS. The memory 120 is coupled to the processor 110 and is configured to store various pieces of information for driving the processor 110. The RF unit 130 is coupled to the processor 110 and is configured to send and/or receive a radio signal. The RF unit 130 may be composed of a plurality of nodes coupled to the BS 100 in a wire manner.

The UE 200 includes a processor 210, memory 220, and an RF unit 230. The processor 210 performs the above-described functions and methods. For example, the processor 210 reserves a plurality of configured Physical Uplink Control Channel (PUCCH) resources through which CSI can be transmitted through a higher layer signal, such as an RRC message, from a BS or a node. The PUCCH resources are resources through which periodic CSI can be transmitted. Furthermore, the processor 210 receives a plurality of reference signals from allocated nodes and generates CSI by measuring each of the plurality of reference signals. Next, the processor 210 sends the CSI about each of the plurality of reference signals through the plurality of PUCCH resources. A method of configuring the plurality of PUCCH resources for the UE and a method of sending periodic CSI through the plurality of PUCCH resources have been described above. The memory 220 is coupled to the processor 210 and is configured to store various pieces of information for driving the processor 210. The RF unit 230 is coupled to the processor 210 and is configured to send and/or receive a radio signal.

The processor 110, 210 may include Application-Specific Integrated Circuits (ASICs), other chipsets, logic circuits, or data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented using a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means.

The present invention may be implemented using hardware, software, or a combination of them. In hardware implementations, the present invention may be implemented using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be implemented using a module performing the above function. The software may be stored in the memory and executed by the processor. The memory or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

What is claimed is:

1. A method for receiving channel state information, the method performed by a base station (BS) and comprising:
   transmitting a radio resource control (RRC) signal to a user equipment (UE), the RRC signal including a plurality of configurations for periodic channel state information (CSI) reports;
   transmitting, to the UE, a plurality of CSI reference signals (CSI-RSs); and
   receiving, from the UE, generated CSI for the plurality of CSI-RSs based on the RRC signal,
   wherein when each of the plurality of configurations for the periodic CSI reports includes only one indicator, the one indicator indicates an uplink subframe to be used, by the UE, for transmitting CSI corresponding to a specific one of the periodic CSI reports, wherein when each of the plurality of configurations for the periodic CSI reports includes a first indicator and a second indicator, each of the first indicator and the second indicator indicates a periodicity and a subframe offset value for an uplink subframe at which CSI can be transmitted by the UE, and wherein when a first CSI-RS is transmitted in a first downlink subframe and a second CSI-RS is transmitted in a second downlink subframe, CSI about the first CSI-RS is received through a first uplink subframe indicated by the first indicator and CSI about the second CSI-RS is received through a second uplink subframe indicated by the second indicator.

2. The method of claim 1, wherein the CSI corresponding to the specific one of the periodic CSI reports is received through a physical uplink control channel (PUCCH) of the uplink subframe.

3. A base station (BS), comprising:
a radio frequency (RF) unit configured to transmit and receive radio signals; and
a processor coupled to the RF unit and configured to:
transmit a radio resource control (RRC) signal to a user equipment (UE), the RRC signal including a plurality of configurations for periodic channel state information (CSI) reports,
transmit, to the UE, a plurality of CSI reference signals (CSI-RSs), and
receive, from the UP, generated CSI for the plurality of CSI-RSs based on the RRC signal, wherein when each of the plurality of configurations for the periodic CSI reports includes only one indicator, the one indicator indicates an uplink subframe to be used, by the UE, for transmitting CSI corresponding to a specific one of the periodic CSI reports, wherein when each of the plurality of configurations for the periodic CSI reports includes a first indicator and a second indicator, each of the first indicator and the second indicator indicates a periodicity and a subframe offset value for an uplink subframe at which CSI can be transmitted by the UE, and wherein when a first CSI-RS is transmitted in a first downlink subframe and a second CSI-RS is transmitted in a second downlink subframe, CSI about the first CSI-RS is received through a first uplink subframe indicated by the first indicator and CSI about the second CSI-RS is received through a second uplink subframe indicated by the second indicator.

4. The BS of claim 3, wherein the CSI corresponding to the specific one of the periodic CSI reports is received through a physical uplink control channel (PUCCH) of the uplink subframe.

* * * * *